US010796411B2

(12) United States Patent
Wolfson et al.

(10) Patent No.: US 10,796,411 B2
(45) Date of Patent: Oct. 6, 2020

(54) SUPER-RESOLUTION IMAGING FOR A MULTI-SENSOR INTERNET OF THINGS ENVIRONMENT

(71) Applicant: EMC IP Holding Company LLC, Hopkinton, MA (US)

(72) Inventors: Kfir Wolfson, Beer Sheva (IL); Assaf Natanzon, Tel Aviv (IL); Jehuda Shemer, Kfar Saba (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 4 days.

(21) Appl. No.: 16/040,775

(22) Filed: Jul. 20, 2018

(65) Prior Publication Data

US 2020/0027196 A1 Jan. 23, 2020

(51) Int. Cl.
*G06T 3/40* (2006.01)
*G06T 5/00* (2006.01)

(52) U.S. Cl.
CPC .......... *G06T 3/4053* (2013.01); *G06T 3/4038* (2013.01); *G06T 5/002* (2013.01)

(58) Field of Classification Search
CPC ........ G06T 3/4053; G06T 5/003; G07C 5/008
See application file for complete search history.

(56) References Cited

U.S. PATENT DOCUMENTS

| 10,156,992 | B2 | 12/2018 | Geisler et al. |
| 2009/0009317 | A1 | 1/2009 | Weaver et al. |
| 2010/0124941 | A1* | 5/2010 | Cho .................. H04M 1/72544 455/556.1 |
| 2010/0208637 | A1 | 8/2010 | Park et al. |
| 2010/0241655 | A1 | 9/2010 | Lee et al. |

(Continued)

FOREIGN PATENT DOCUMENTS

EP 0771102 * 10/2003 ............... H04N 1/40

OTHER PUBLICATIONS

U.S. Appl. No. 15/959,592 entitled, "Data Management Policies for Internet of Things Components," filed Apr. 23, 2018.

(Continued)

*Primary Examiner* — Myron Wyche
(74) *Attorney, Agent, or Firm* — Ryan, Mason & Lewis, LLP

(57) ABSTRACT

Image combination techniques are provided for a multi-sensor Internet of Things environment. An exemplary method comprises: dynamically determining an image resolution for at least a portion of an image to be collected by and/or transmitted by a plurality of image sensors within a distributed network based on one or more predefined image resolution rules with respect to an available bandwidth; and combining the image portions from the plurality of image sensors to generate at least one higher resolution image, such as a super-resolution image. The predefined image resolution rules specify, for example, that the portions of an image that have changed should be transmitted with a higher resolution relative to portions of the image that have not changed; and/or that multiple versions of a given image should be combined when the given image is degraded by noise. A plurality of low resolution images having a substantially similar alignment are optionally obtained and combined to obtain at least one high resolution image.

20 Claims, 4 Drawing Sheets

(56) References Cited

U.S. PATENT DOCUMENTS

| | | |
|---|---|---|
| 2013/0018575 A1 | 1/2013 | Birken et al. |
| 2014/0019397 A1 | 1/2014 | Alexander et al. |
| 2014/0055627 A1* | 2/2014 | Fujii .................. H04L 67/32 348/207.1 |
| 2014/0148699 A1* | 5/2014 | Shim ................... A61B 8/4411 600/441 |
| 2014/0267652 A1* | 9/2014 | Wexler ................ G09B 21/006 348/63 |
| 2014/0288866 A1 | 9/2014 | Lee et al. |
| 2015/0003309 A1 | 1/2015 | Mukherjee |
| 2015/0112980 A1* | 4/2015 | Sanio ................ G06Q 30/0276 707/728 |
| 2016/0018879 A1 | 1/2016 | Hsiao et al. |
| 2016/0197999 A1 | 7/2016 | Chun et al. |
| 2016/0309141 A1* | 10/2016 | Pulli ...................... G06T 5/003 |
| 2017/0092139 A1 | 3/2017 | Wang et al. |
| 2017/0132853 A1* | 5/2017 | Matos ................... G07C 5/008 |
| 2017/0289738 A1 | 10/2017 | Jepson et al. |
| 2018/0188380 A1 | 7/2018 | Venkatraman et al. |
| 2018/0288502 A1 | 10/2018 | Higuchi et al. |
| 2018/0345958 A1 | 12/2018 | Lo et al. |
| 2018/0365704 A1 | 12/2018 | Atkinson et al. |
| 2018/0365977 A1 | 12/2018 | Inoue et al. |
| 2018/0371940 A1 | 12/2018 | Pool et al. |

OTHER PUBLICATIONS

U.S. Appl. No. 16/024,757 entitled, "Data Reduction Techniques for a Multi-Sensor Internet of Things Environment," filed Jun. 30, 2018.

Geddik et al., "ASAP: An Adaptive Sampling Approach to Data Collection in Sensor Networks", Published in: IEEE Transactions on Parallel and Distributed Systems (vol. 18, Issue: 12, Dec. 2007) pp. 1766-1783, Nov. 5, 2007.

Martincic et al., "Adaptive data collection in sensor networks", Published in 2009 2nd IFIP Wireless Days (WD), Date of Conference: Dec. 15-17, 2009, Date Added to IEEE Xplore: Apr. 15, 2010 (2009).

Makhoul et al., "Data Reduction in Sensor Networks: Performance Evaluation in a Real Environment", Published in IEEE Embedded Systems Letters, vol. 9, Issue 4, Dec. 2017, pp. 101-104, Sep. 5, 2017.

Liang et al.; "Redundancy Reduction in Wireless Sensor Networks Using SVD-QR", Published in: MILCOM 2005-2005 IEEE Military Communications Conference Date of Conference: Oct. 17-20, 2005 Date Added to IEEE Xplore: Mar. 20, 2006; DOI: 10.1109/MILCOM.2005.1605943; Print ISBN: 0/7803-9393-7 (Year: 2006).

Xie etal.; "Anomaly Detection and Redundancy Elimination of Big Sensor Data in InternetofThings"; arXiv:1703.03225v1 [cs.DC] Mar. 9, 2017, https://arxiv.org/abs/1703.03225v1 (Year: 2017).

* cited by examiner

SUPER-RESOLUTION IMAGING FOR A MULTI-SENSOR INTERNET OF THINGS ENVIRONMENT

FIELD

The field relates generally to the processing of sensor data.

BACKGROUND

An Internet of Things (IoT) network typically comprises distributed physical devices, such as vehicles and sensors, that exchange data over the network. With the proliferation of IoT networks, sensor data comprises information regarding a number of diverse physical variables. Such information is useful for a wide range of applications, such as surveillance and other law enforcement applications, medical monitoring, transportation monitoring, habitat monitoring, factory control, and pipeline integrity.

A number of IoT management frameworks exist for managing devices that generate and process sensor data. As society grows increasingly dependent on such sensor data, the proper management and collection of the gathered sensor data also becomes important. It has been estimated, for example, that the amount of sensor data generated and transferred by vehicle sensors significantly exceeds the amount of available bandwidth, including the bandwidth available using vehicle-to-vehicle and other communication routing mechanisms.

A need exists for bandwidth-based imaging techniques for a multi-sensor IoT environment.

SUMMARY

Illustrative embodiments of the present disclosure provide image combination techniques for a multi-sensor IoT environment. In one embodiment, an exemplary method comprises: dynamically determining an image resolution for at least a portion of an image to be collected by and/or transmitted by a plurality of image sensors within a distributed network based on one or more predefined image resolution rules with respect to an available bandwidth; and combining the image portions from the plurality of image sensors to generate at least one higher resolution image, such as a super-resolution image.

In various embodiments of the disclosure, the predefined image resolution rules (i) specify that the portions of an image that have changed should be transmitted with a higher resolution relative to portions of the image that have not changed; (ii) specify that multiple versions of a given image should be combined when the given image is degraded by noise; and/or (iii) are based on one or more predefined policies. In at least one embodiment, a plurality of low resolution images having a substantially similar alignment are obtained and combined to obtain at least one high resolution image.

Other illustrative embodiments include, without limitation, apparatus, systems, methods and computer program products comprising processor-readable storage media.

DETAILED DESCRIPTION

Figure 1:
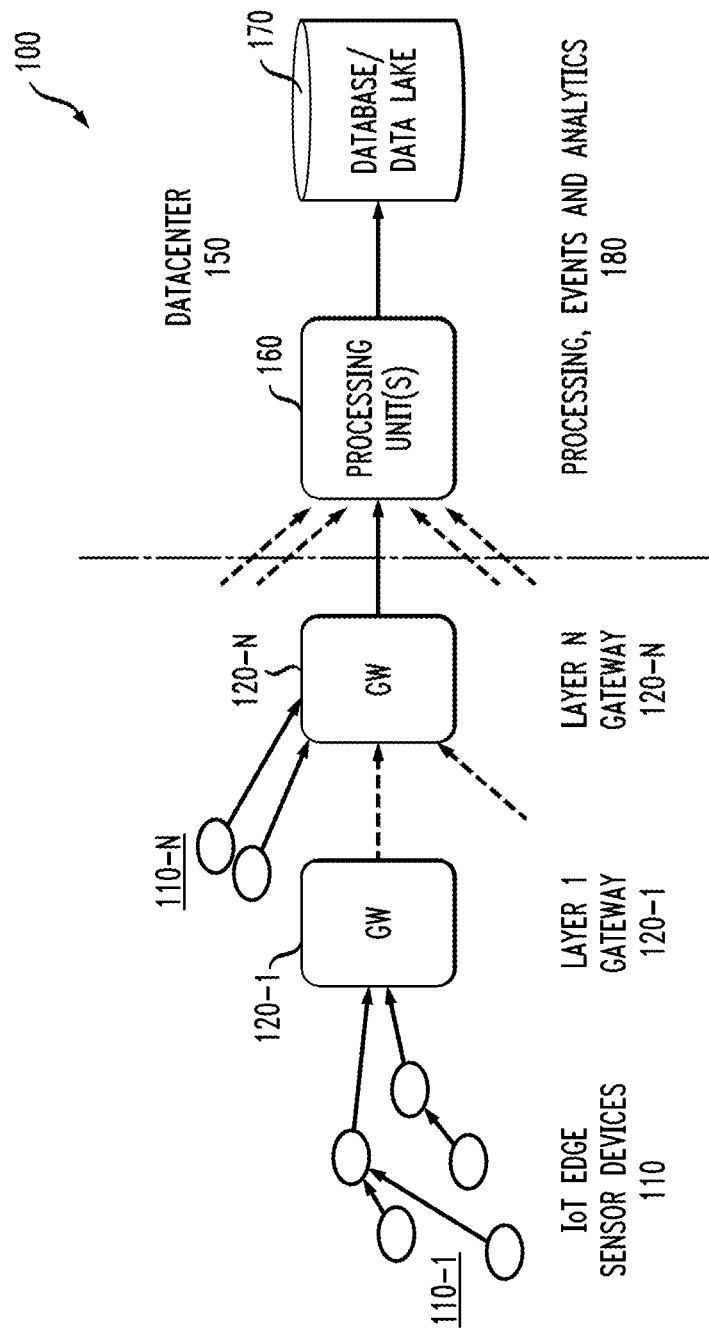
FIG. 1 illustrates an exemplary IoT system, according to one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. Accordingly, the term "sensor" as used herein is intended to be broadly construed, so as to encompass, for example, sensors designed specifically for a specific purpose, such as thermometers, cameras and smoke detectors, as well as general-purpose devices, such as smartphones and tablets that perform a sensing function. One or more embodiments of the disclosure provide methods, apparatus and computer program products for combining images in a multi-sensor IoT environment.

In one or more embodiments, super-resolution imaging techniques are provided to manage (i) a bandwidth used by a plurality of image sensors in a distributed network, (ii) a collection and/or transmission of the collected image sensor data, and/or (iii) a selection of the image sensor data to collect and/or transmit (and at what resolution). One or more embodiments employ cross-sensor distributed algorithms to substantially reduce an amount of image data collected and/or transmitted by a given sensor, while still achieving super-resolution images.

Thus, some embodiments of the disclosure provide super-resolution algorithms, to create high resolution results while utilizing relatively low bandwidth, for example, by sampling each image multiple times and creating super-resolution images. While the exemplary embodiments address the creation of super-resolution images, the disclosed super-resolution imaging techniques may be applied to obtain super-resolution forms of other non-image information, as would be apparent to a person of ordinary skill in the art.

Generally, super-resolution imaging is a class of techniques that enhance the resolution of an imaging system. In some super-resolution imaging techniques, referred to as optical super-resolution imaging, the diffraction limit of systems is transcended, while in others, referred to as geometrical super-resolution imaging, the resolution of digital imaging sensors is enhanced. Super-resolution imaging techniques are used, for example, in general image processing and in super-resolution microscopy.

In some embodiments, the disclosed super-resolution imaging techniques are based on a proximity between image sensors, such as image sensors on one or more vehicles. It has been found that image sensors with close geographical proximity and/or temporal proximity tend to create similar or even substantially identical image sensor data. By creating localized dynamic distributed sensor networks, time, space and/or priority information between sensors can be coordinated and thereby allow each vehicle, for example, to make intelligent decisions on reducing the amount of image data collected and/or transmitted.

In one or more embodiments, holistic super-resolution imaging techniques are provided for treating image sensor data in an IoT system. The disclosed super-resolution imaging policies and rules connect IoT components, their image sensor data and corresponding metadata in a way that allows advanced super-resolution imaging operations to be employed across a distributed network of image sensor devices within an IoT system.

One or more aspects of the present disclosure recognize that complex IoT systems have complex bandwidth limitations, and the failure to address these limitations may result in degraded systems or a loss of service. A naïve view that these systems have an infinite amount of back-end storage and infinite bandwidth to transmit the data is now encountering barriers of capacity and cost. When systems scale, the amount of image data to be collected by image sensors and transmitted to gateways is often too much, especially when some of the image sensor data may be redundant with image sensor data collected by other image sensors in temporal and/or geographic proximity. Apart from the bandwidth and cost-related aspects, there are implications on the back-end processing scale and cost as well.

In one or more embodiments, a distributed vehicle network comprises a network between vehicles that are within a predefined proximity. For example, a given vehicle in a distributed vehicle network has a set of other vehicles that the given vehicle can connect with (e.g., each vehicle potentially sees a different network (the sub-set of vehicles in its area)). The distributed vehicle network is dynamic in the sense that the set of vehicles can change over time.

In some embodiments, a hotspot (or a point of interest) is a geographical location that for a time period is interesting. A point of interest can be a fixed hotspot, such as a pothole, obstacle or a vehicle accident at a specific location, or a transient hotspot, such as an animal running through a junction.

In one or more embodiments, directional sensors comprise sensors that have a direction of sampling, such as cameras or proximity sensors. With a camera, the direction of the picture typically matters. With vehicles, it is assumed (but not required) that the direction of sampling is along the direction that a given vehicle is travelling.

In at least one embodiment, a multi-resolution format or protocol, such as JPEG (Joint Photographic Experts Group) wavelet technology, is employed to reduce resolution of the sample in an incremental manner. For example, part of the information can be sent up to a specific resolution and sending more information will incrementally increase the resolution.

FIG. 1 illustrates an exemplary IoT system 100, according to one embodiment of the disclosure. Generally, IoT systems, such as the exemplary IoT system 100, typically consolidate edge devices to gateways and then to a central back-end datacenter where most of the processing is done. There can be several layers of gateways. New edge devices are introduced and others retire constantly and the exemplary IoT system 100 needs to handle these topology changes.

As shown in FIG. 1, a plurality of IoT edge sensor devices 110-1 through 110-N (generally referred to herein as sensors 110) provide corresponding sensor readings to one or more layer 1 through layer N gateways 120-1 through 120-N. The IoT edge sensor devices 110-1 through 110-N comprise, for example, sensors, actuators and other devices that produce information or get commands to control the environment they are in. The gateways 120 comprise devices that consolidate communication and management of multiple IoT edge sensor devices 110. For example, a vehicle can be treated as a first gateway layer 120-1 to the multiple sensors that exist within the vehicle. In some embodiments, vehicles are connected to a regional edge layer (not explicitly shown in FIG. 1), where the region can be, for example, a cell of a cellular network. The regional gateways can be connected in some embodiments to country cloud/gateways that are connected to a global cloud.

One or more sensor devices 110 in vehicles, for example, can generate and distribute high resolution images and maps. High resolution maps are obtained in some embodiments by taking, for example, a 10 megapixel image every two meters (this is an emerging industry standard). With 100 million vehicles on the road, for example, this will produce many EB (exabyte) of data a month.

One or more aspects of the present disclosure recognize that the amount of data generated by a distributed network of vehicles, for example, is often more than can be transmitted to a centralized cloud, and thus localized networks can be used. Unfortunately, in crowded areas, even the localized network will not be able to accept all of the data from all of the vehicles in the area.

With the current industry approach, there is not enough bandwidth for vehicles to transmit all of the produced sensor data to the cloud. Thus, the sensor data creates network congestion, potentially causing important sensor data to not be sent, to not be delivered or to arrive outside of a defined service level agreement.

As defined above, each vehicle in the exemplary embodiment has its own view of the vehicle population in the area. Therefore, each vehicle essentially has its own vehicle network. As noted above, the vehicle network may not be symmetric as, in some situations, vehicle A may include vehicle B in its network, but vehicle B may not have vehicle A in its network. Due to the speed of the vehicles, vehicles may go in and out of a network within seconds. Here are some ways to establish vehicles in a network in various embodiments:

1. Direct transmission radius—a vehicle typically transmits a radio signal with specific power constraints. Any vehicle that receives that signal and is able to respond is part of the network. Note that although the power is typically fixed, the radius of the network will often be different between vehicles due to physical obstructions and factors that affect signal-to-noise ratios.

2. Radius—using vehicle-to-vehicle networking (or with the help of stationary posts like cellular networks), the limits of radio transmission can be overcome by relaying. Vehicles can respond if they are within a specific radius.

3. Trajectory/location—in some embodiments, vehicles send not just geo-location information but also trajectory and speed. Vehicles that respond need to be in near proximity but also with similar trajectory (or opposite trajectory). This allows for a formation of networks along routes.

While gateways 120 are employed in the exemplary embodiment of FIG. 1, the gateways 120 are not mandatory. Gateways 120 are prevalent in numerous implementations, as networking capabilities of sensors 110 are usually local in nature (e.g., power or connectivity) and the gateway 120 is used to connect to the Internet (not shown in FIG. 1).

The sensors 110 can be, for example, sensors designed for a specific purpose, such as thermometers, cameras and smoke detectors, as well as general-purpose sensor devices, such as, for example, smartphones and tablets that perform a sensing function, as would be apparent to a person of ordinary skill in the art. In one or more embodiments, the sensors 110 comprise the following public properties: substantially unique identifier (ID), geo-location, and clock timestamp (ongoing).

In some embodiments, the disclosed image sensors comprise, without limitation, one or more of a camera, an optical camera, a digital camera, an infrared camera, a thermal sensor array, a radar imagery device (e.g., ground mapping or SAR (synthetic-aperture radar)); a sonar imagery device, an ultrasound imagery device, a nuclear magnetic resonance imagery device (such as an MRI (Magnetic Resonance Imaging) device), a volumetric motion sensor (especially microwave-based sensors), a radio-telescope, a three-dimensional camera, and one or more of an x-ray device, a computed tomography (CT, cat scan) device, a positron emission tomography (PET)-CT device and similar x-ray-based technologies.

The exemplary IoT system 100 of FIG. 1 further comprises a datacenter 150 comprising one or more processing unit(s) 160 and a database or data lake 170. The datacenter 150 performs one or more of processing, events and analytics functions 180, in a known manner.

While one or more exemplary embodiments are described herein using sensor devices 110 associated with vehicles, any image sensors can be employed, as would be apparent to a person of ordinary skill in the art. Further, while one or more exemplary embodiments are described herein using high resolution maps for connected vehicles, the disclosed techniques work for any multi-sensor environments where sensors generate large amounts of image data.

Figure 2:
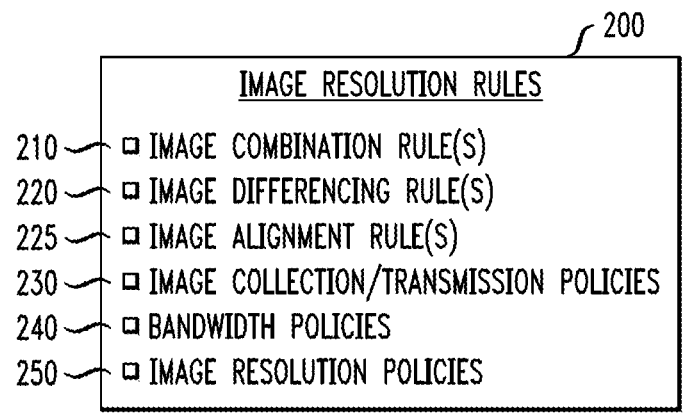
FIG. 2 illustrates an exemplary set of image resolution rules, according to some embodiments.

FIG. 2 illustrates an exemplary set of image resolution rules 200, according to some embodiments. Generally, the exemplary set of image resolution rules 200 defines how various IoT image sensor devices 110 of the exemplary IoT system 100 of FIG. 1 should collect, transmit and/or process the sensor data. Currently, each sensor 110 decides when and what data to transmit, without regard to what data is available and what other sensors 110 can send. For example, in the application of high resolution map systems, one standard requires a high resolution image of the road every two meters. In crowded areas, there will be many vehicles transmitting similar images (comprising large amounts of information) multiple times. Since the bandwidth in a cellular network is limited per area, too many sensors 110 trying to send the data at once will cause congestion. There is currently no mechanism to limit the total amount of data that all of the vehicles collectively send.

As shown in FIG. 2, the exemplary image resolution rules 200 comprises one or more image combination rule(s) 210; one or more image differencing rule(s) 220; one or more image alignment rule(s) 225; one or more image collection/transmission policies 230; one or more bandwidth policies 240; and one or more image resolution policies 250.

In some embodiments, the image combination rule(s) 210 can be employed to implement super-resolution imaging optimizations to collect lower resolution image data from multiple sensors (e.g., in a geographical area) and to exploit the inherent redundancy of these image samples (e.g., to either reduce the amount of samples collected or their resolution, or improve the resulting information by exploiting the redundancy) to obtain super-resolution images. Spatial imaging optimizations can be employed for non-directional sensors, as well as directional sensors in some cases.

For example, one or more image combination rule(s) 210 can specify that a plurality of low resolution images having a substantially similar alignment are obtained and that the low resolution images are combined to obtain at least one high resolution image. The criteria for qualifying as a substantially similar alignment may be specified, for example, by one or more image alignment rules 225, discussed below, that evaluate the alignment, for example, based on previously obtained images. In addition, the image combination rule(s) 210 optionally specify that the plurality of low resolution images is collected over time.

Generally, the exemplary image resolution rules 200 can specify a sampling policy, a resolution policy, a selective increment policy and/or a sensor density based on location and/or proximity. An exemplary sampling policy can specify that only X vehicles that meet some criteria in a given network or area should send an image sensor data sample. For example, a function min (# cars/10, 100) indicates that only 10% of the vehicles in the area will send the information, and no more than 100 vehicles (for example, the first 100 vehicles with an identifier that ends in "0"). This sampling policy significantly reduces the amount of image data sent and also limits the amount of bandwidth used so that congestion is throttled.

In addition, a resolution policy can be based on a resolution by distance from a particular hotspot, or an inverse resolution by distance. For an implementation based on a resolution by distance from a particular hotspot, vehicles can calculate the distance from the hotspot and will reduce their sample resolution the further they are from the hotspot. This reduction can be a linear reduction or a higher order function. Generally, the further a vehicle is away from the hotspot, the less relevant the information that the vehicle will send.

For an implementation based on an inverse resolution by distance from a particular hotspot, the previous resolution policy is reversed and is used to control congestion points. In particular, geographic areas having a lot of vehicles can reduce the transmitted image resolution, as redundancy in the samples can be used to compensate for the overlap to create super-resolution images. The further you are from the point where there are many vehicles, the collected samples are more dispersed and, therefore, more resolution is needed to compensate.

One or more of the exemplary image differencing rule(s) 220, for example, can specify that the image portions that have changed between two time adjacent images should be transmitted with a higher resolution relative to portions of the image that have not changed. In one exemplary implementation, the super-resolution imaging system can compare a high resolution image to the low resolution image and transmit areas that differ in a higher resolution and areas that have not changed in a lower resolution (or not transmit them at all).

For example, the exemplary image differencing rule(s) 220 can be employed to specify that when a portion of an image has changed, such as a particular hotspot or point of interest (e.g., a rock or obstacle in the roadway), then the portion of the images that capture the hotspot or point of interest should be transmitted with a higher resolution.

One or more aspects of the disclosure recognize that bandwidth is time limited, and that transmitting pieces of the image at different times will make better use of the available bandwidth. This means that if, for example, an area of an image does not change often, and an image is transmitted every five minutes, after a period of time enough images will be available to create a super-resolution image with less noise.

With an exemplary selective increment policy, for example, a predefined number or percentage of vehicles transmit the images or other sensor data with a predefined low resolution. In addition, a predefined number or percentage of additional vehicles transmit the images or other sensor data with a predefined higher resolution. These additional vehicles (or a central location) compare the low resolution images to the higher resolution images from the geographic area, determine if there is a suspected change, and, if so, request a full resolution image.

Multi-resolution properties, discussed above, are advantageous for use in some embodiments with a selective increment policy. For example, with wavelet-based JPEG technology, a low resolution image can be sent by sending a truncated prefix of the file (e.g., no additional downsampling is needed). If the need for a higher resolution is detected, another incremental section of the file can be sent, so data transmission is efficient. The desired truncation point of each level can be governed by resolution or bandwidth constraints of one of the above optimizations or a policy, discussed below.

With an exemplary sensor density policy, a metric of the sensor density in a specific area can be applied. For example, the sensor density policy can specify a number of sensors of a specific type per square meter, and control transmission resolution according to the local sensor density. The local density is something the vehicles can be aware of, in some embodiments, without going all the way to the central location by using the local network information. This is a global version of earlier options that does not refer to a specific location or hotspot but performs a global average over time and/or space.

As noted above, one or more embodiments combine a plurality of low resolution images having a substantially similar alignment to obtain at least one high resolution image. The criteria for qualifying as a substantially similar alignment may be specified, for example, by one or more image alignment rule(s) 225. In some embodiments, one or more of the exemplary image alignment rule(s) 225 can specify that the image alignment is evaluated based on previously obtained images from the cameras or other image sensors.

For example, when a car camera captures an image it knows the direction of the image and the location. While accuracy may not be perfect, previous mapping information can be employed, such as a low resolution image from the cloud, to allow an alignment of the car camera to create an almost identical image (substantially identical location and angle). Transmitting images with similar alignments will allow for an easier execution of the disclosed super resolution algorithms.

In one or more embodiments, temporal-based rule(s) can also be employed to implement temporal policies to substantially optimize image samples based on time or a time difference between samples. Vehicles passing through the same area at a similar time will most probably generate the same image and there may not be a need for this amount of redundancy. Mobile directional sensors, for example, can benefit from these kinds of temporal optimizations.

For example, one or more temporal-based rule(s) can specify policies for a hotspot over time, where vehicles driving through the same point in the same trajectory take the same or very similar images. Therefore, vehicles can optionally use the network to declare that they took an image at X=(point, trajectory, time). One or more central locations, such as one or more gateways and/or a central back-end datacenter, will maintain a counter, and each vehicle can make a local decision regarding image collection based on messages from the higher layer. Now, only every N vehicles (N=10, for example) will take another image. An average vehicle velocity can optionally be taken into consideration as the faster that the traffic is moving, the more vehicles that can pass before another sample is taken.

In one variation, the specified policies for a hotspot over time can also specify a maximum time. For example, the policy can specify that every N vehicles will take another image a maximum of every 10 minutes. Thus, if there is low traffic, images will still arrive at sufficient intervals.

In addition, one or more temporal-based rule(s) can specify that substantially all vehicles in a network will sample at substantially the exact same time (e.g., at the start of every minute). Since vehicles are distributed over an area, a sample set is obtained of many locations at the same time, and there is no need to take samples in between the specified time, as other vehicles have covered the area. In various embodiments, the time interval may be set by a central location, a policy or by a distributed decision algorithm that selects an integer.

In further variations, one or more temporal-based rule(s) can specify a variable resolution, or a variable resolution over time. With a variable resolution, every N vehicles takes a high resolution image while the remaining vehicles obtain a low resolution image. With a variable resolution over time, for each predefined interval (e.g., every X minutes), a high resolution image is taken by a predefined number of vehicles closest to a given location (e.g., one vehicle), while the remaining vehicles obtain a low resolution image.

As shown in FIG. 2, the exemplary image resolution rules 200 further comprises one or more image collection/transmission policies 230; one or more bandwidth policies 240; and/or one or more image resolution policies 250, discussed below. The image collection/transmission policies 230, bandwidth policies 240 and/or image resolution policies 250 can be combined with spatial-based rules and/or temporal based rules to achieve a desired image resolution policy.

In some embodiments, the exemplary image collection/transmission policies 230 can specify that multiple versions of a given image should be combined when the given image is degraded by noise. When an image is degraded by noise, there can be more detail in the average of many exposures, even within the diffraction limit. Further, some object features, though beyond the diffraction limit, may be known to be associated with other object features that are within the limits and hence contained in the image. Thus, conclusions can be drawn, using statistical methods, from the available image data, about the presence of the full object.

A location of an image source is obtained in some embodiments by computing a centroid of a light distribution extending over a plurality of adjacent pixels in portions of images from at least one of the image sensors. In this manner, the location of a single source can be determined by computing the "center of gravity" (centroid) of the light distribution extending over several adjacent pixels. Provided that there is enough light, this can be achieved with arbitrary precision (e.g., better than a pixel-width of the detecting apparatus and the resolution limit). This analysis provides an understanding of whether the source light comes from a single source or multiple sources, as discussed further below in conjunction with FIG. 5.

In one or more embodiments, one or more parameters of the image resolution rules 200 can have an explicit or relative target (e.g., down sample the sensor data to half of the original resolution, or filter data to 3 KB per second).

The interactions in the exemplary IoT system 100 show how a change in one parameter of the image resolution rules 200 may affect other parts of the IoT system 100. For example, increasing the sampling rate (resolution) results in more storage and more CPUs required to process the data.

Thus, the image resolution rules 200, or portions thereof, enable to following techniques:

1. aligning images so that multiple images will be from a substantially identical location and angle (for example, using previously available maps for alignment);

2. transmitting changed locations in high resolution and other locations of an image with a lower resolution (e.g., if locations are identical, leverage similarity for better compression); and 3. leveraging multiple low resolution images or images portions to create a super resolution image.

For an additional discussion of suitable super-resolution imaging techniques, see, for example, https://en.wikipedia.org/wiki/Super-resolution imaging. Generally, leveraging the multiple disclosed super-resolution imaging methods, the disclosed super-resolution imaging system can control the amount of bandwidth used while still achieving high resolution images for high resolution maps.

One or more embodiments leverage the overlap in car images to create higher resolution images for processing. In this manner, the initial resolution of images transmitted is reduced and bandwidth is saved. Generally, the more cars in a given area, the higher the overlap of images, and the more potential bandwidth that can be saved. A limit is optionally placed on the total amount of bandwidth used across all cars in an area (e.g., up to quantization limits and overheads).

In addition to the optimization parameters specified in the exemplary image resolution rules 200 of FIG. 2, other data constraints may be given. In some variations, the image resolution rules 200 may include the following parameters:

a desired resolution of data (such as, for a given geographic region (e.g., a 20 MP image is needed of the road every two meters); and/or for a given unit of time (e.g., a picture is needed every two hours));

a bandwidth policy (such as limiting the total amount of bandwidth (e.g., up to 30 Mb/sec in each cellular cell); and/or the amount of data each sensor transmits (e.g., total transmission of a sensor can be limited or maximal burst bandwidth sensor uses can be limited)); and a sampling policy (e.g., whether updates to specific locations are favored over other locations).

Figure 3:
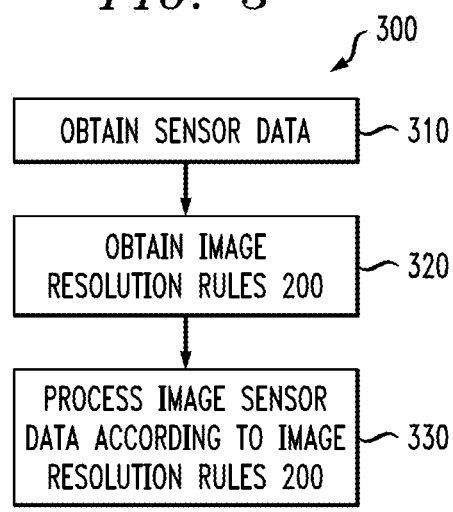
FIG. 3 is a flow chart illustrating a super-resolution imaging implementation process, according to an embodiment of the disclosure.

FIG. 3 is a flow chart illustrating a super-resolution imaging implementation process 300, according to an embodiment of the disclosure. The exemplary super-resolution imaging implementation process 300 is implemented by a given IoT component in the IoT system 100 of FIG. 1 (e.g., the techniques can be applied at any level, such as multiple sensors within an area, or by gateways, concentrators, hubs or other aggregation devices of the same type, or a different type). As shown in FIG. 3, during step 310, the exemplary super-resolution imaging implementation process 300 initially obtains sensor data. During step 320, the IoT component obtains the image resolution rules 200 (FIG. 2) for processing of the image sensor data by one or more IoT components. Finally, during step 330, the exemplary super-resolution imaging implementation process 300 processes the image sensor data based on the image resolution rules 200.

Figure 4:
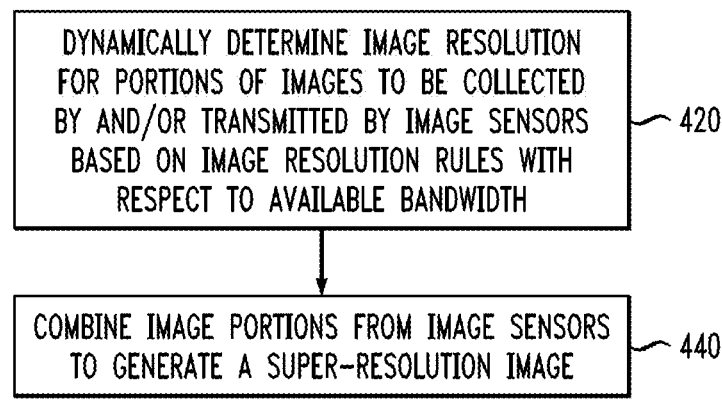
FIG. 4 is a flow chart illustrating an exemplary implementation of a super-resolution imaging process, according to some embodiments of the disclosure.

FIG. 4 is a flow chart illustrating an exemplary implementation of a super-resolution imaging process 400, according to some embodiments of the disclosure. As shown in FIG. 4, the exemplary super-resolution imaging process 400 dynamically determines, during step 420, an image resolution for portions of images to be collected by and/or transmitted by image sensors in the IoT system 100 of FIG. 1, based on the image resolution rules 200 with respect to an available bandwidth.

Thereafter, the image portions from the various image sensors are combined to generate a super-resolution image during step 440.

Figure 5:
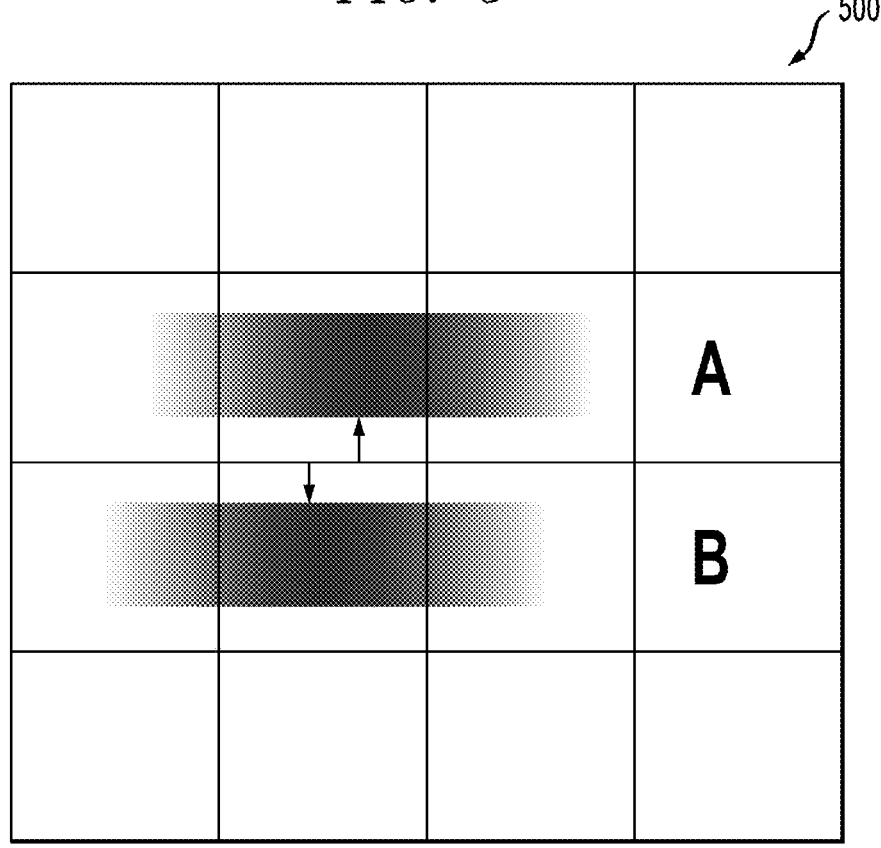
FIG. 5 illustrates an exemplary technique for sub-pixel image localization for the exemplary IoT system of FIG. 1, according to one embodiment of the disclosure.

FIG. 5 illustrates an exemplary sub-pixel image localization technique 500 for the exemplary IoT system 100 of FIG. 1, according to one embodiment of the disclosure. As noted above, a location of an image source is obtained in some embodiments by computing a centroid of a light distribution extending over a plurality of adjacent pixels in at least portions of images from at least one of the image sensors. Provided that there is enough light, this can be achieved with arbitrary precision (e.g., better than a pixel-width of the detecting apparatus and the resolution limit). This analysis optionally provides an understanding of whether the source light comes from a single source or multiple sources.

In the example of FIG. 5, both features A and B extend over three pixels, but with different amounts. Thus, the features can be localized with a precision that is superior to the pixel dimension using image localization techniques.

For a more detailed discussion of suitable techniques for using a policy and propagating the policy throughout the IoT system 100, see, for example, U.S. patent application Ser. No. 15/959,592, filed Apr. 23, 2018, entitled "Data Management Policies for Internet of Things Components," incorporated by reference herein in its entirety.

The image resolution rules and/or policies can be defined according to geography (regionally, for example), over time (e.g., take more samples at night) or dynamically (e.g., according to hotspots or other points of interest). Vehicles are optionally updated with the image resolution rules 200 (or portions thereof), as those may change over time/location and the vehicles can adapt accordingly.

In some embodiments, the super-resolution imaging framework can support multiple environments. For example, the super-resolution imaging framework can accept general limitations (e.g., bandwidth limits (per device/per area) or required samples (sample resolution, sample time difference)). In one or more embodiments, the super-resolution imaging algorithms will have generic APIs for sample resolution and, for example, how many samples are needed for super-resolution. The super-resolution imaging framework optionally automatically calls the algorithms based on the available bandwidth and the required policy. In this manner, localized algorithms are created and managed by a global policy.

One or more embodiments of the disclosure address the problems of multiple uncoordinated IoT sensor devices sending very large amounts of image information to a back-end service. The disclosed super-resolution imaging techniques reduce the traffic by avoiding the transmission of redundant image data in some embodiments. Various algorithms are provided to determine the data to send and to increase control and simplify usage for the IoT system administrators in the form of policies.

One or more embodiments of the disclosure provide improved methods, apparatus and computer program products for super-resolution imaging for various components of an IoT system. The foregoing applications and associated embodiments should be considered as illustrative only, and numerous other embodiments can be configured using the techniques disclosed herein, in a wide variety of different applications.

It should also be understood that the disclosed techniques for implementing super-resolution imaging techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for implementing super-resolution imaging for various components of an IoT system may be implemented using one or more processing platforms. One or more of the processing modules or other components may therefore each run on a computer, a storage device or other processing platform elements. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality, as illustrated and described herein, are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a super-resolution imaging rules engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a super-resolution imaging rules platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
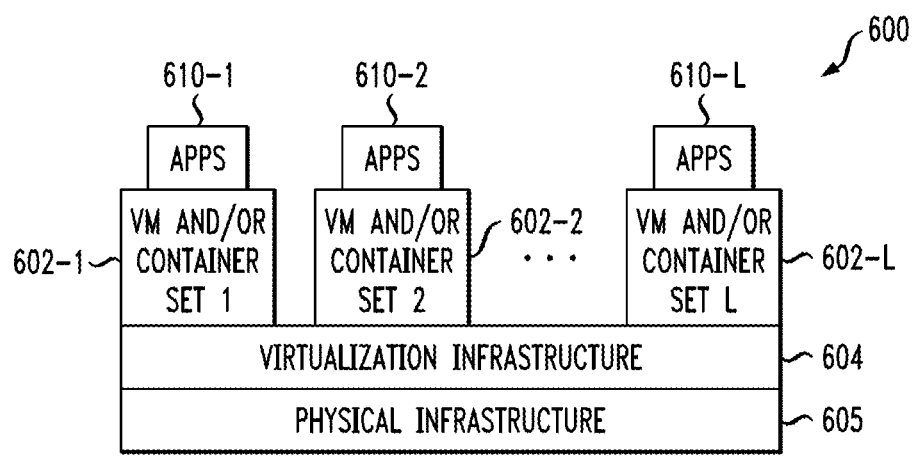
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the disclosed super-resolution imaging system. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide super-resolution imaging functionality of the type described above for one or more processes running on a given one of the VMs. For example, each of the VMs can implement super-resolution imaging control logic and associated super-resolution imaging functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide super-resolution imaging functionality of the type described above for one or more processes running on different ones of the containers. For example, a container host device supporting multiple containers of one or more container sets can implement one or more instances of super-resolution imaging control logic and functions.

As is apparent from the above, one or more of the processing modules or other components of disclosed super-resolution imaging system may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM (random-access memory), ROM (read-only memory) or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
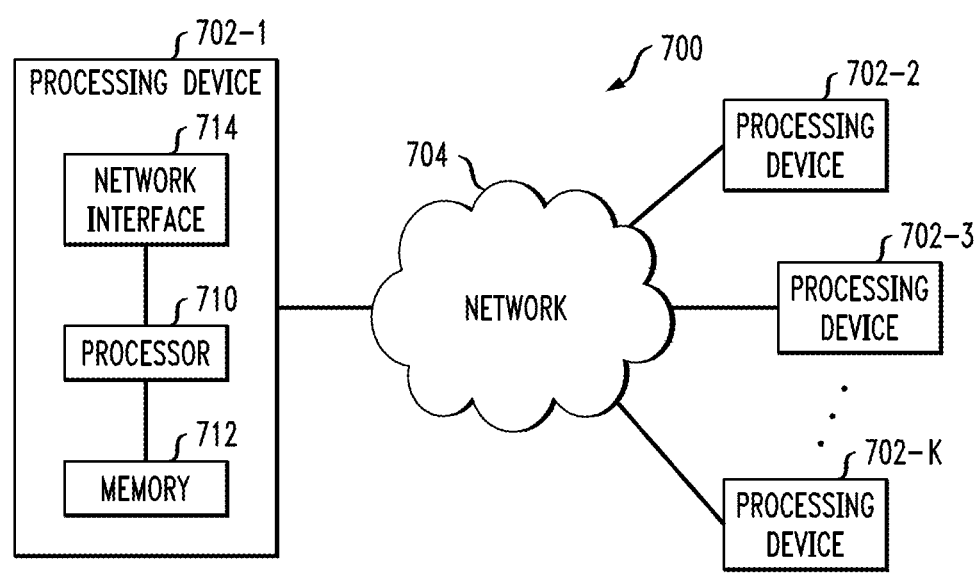
FIG. 7 illustrates another exemplary processing platform that may be used to implement at least a portion of one or more embodiments of the disclosure.

Multiple elements of system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
dynamically determining, by at least one processing device within a distributed network comprised of a plurality of image sensors, an image resolution for at least a portion of an image to be transmitted by the plurality of image sensors within the distributed network based on one or more predefined image resolution rules with respect to an available bandwidth; and
combining, by the at least one processing device, the image portions from the plurality of image sensors to generate at least one higher resolution image.

2. The method of claim 1, further comprising the steps of obtaining a plurality of low resolution images having a substantially similar alignment and combining the plurality of low resolution images to obtain at least one high resolution image.

3. The method of claim 2, wherein the one or more predefined image resolution rules specify that the plurality of low resolution images is collected over time.

4. The method of claim 2, wherein the substantially similar alignment of the low resolution images is determined based on previously obtained images.

5. The method of claim 2, wherein one or more of the low resolution images are obtained based on one or more of an instruction from at least one aggregation device and one or more predefined policies.

6. The method of claim 1, wherein the one or more predefined image resolution rules specify that the portions of an image that have changed should be transmitted with a higher resolution relative to portions of the image that have not changed.

7. The method of claim 1, wherein the one or more predefined image resolution rules specify that multiple versions of a given image should be combined when the given image is degraded by noise.

8. The method of claim 1, further comprising the step of determining a location of an image source by computing a centroid of a light distribution extending over a plurality of adjacent pixels in the image portions from at least one of the image sensors.

9. The method of claim 1, wherein the one or more predefined image resolution rules are based on one or more predefined policies.

10. A system, comprising:
a memory; and
at least one processing device, coupled to the memory, operative to implement the following steps:
dynamically determining an image resolution for at least a portion of an image to be transmitted by a plurality of image sensors within a distributed network based on one or more predefined image resolution rules with respect to an available bandwidth; and
combining the image portions from the plurality of image sensors to generate at least one higher resolution image.

11. The system of claim 10, further comprising the steps of obtaining a plurality of low resolution images having a substantially similar alignment and combining the plurality of low resolution images to obtain at least one high resolution image.

12. The system of claim 10, wherein the one or more predefined image resolution rules specify that the portions of an image that have changed should be transmitted with a higher resolution relative to portions of the image that have not changed.

13. The system of claim 10, wherein the one or more predefined image resolution rules specify that multiple versions of a given image should be combined when the given image is degraded by noise.

14. The system of claim 10, further comprising the step of determining a location of an image source by computing a centroid of a light distribution extending over a plurality of adjacent pixels in the image portions from at least one of the image sensors.

15. The system of claim 10, wherein the one or more predefined image resolution rules are based on one or more predefined policies.

16. A computer program product, comprising a non-transitory machine-readable storage medium having encoded therein executable code of one or more software programs, wherein the one or more software programs when executed by at least one processing device perform the following steps:
dynamically determining an image resolution for at least a portion of an image to be transmitted by a plurality of image sensors within a distributed network based on one or more predefined image resolution rules with respect to an available bandwidth; and
combining the image portions from the plurality of image sensors to generate at least one higher resolution image.

17. The computer program product of claim 16, further comprising the steps of obtaining a plurality of low resolution images having a substantially similar alignment and combining the plurality of low resolution images to obtain at least one high resolution image.

18. The computer program product of claim 16, wherein the one or more predefined image resolution rules specify that the portions of an image that have changed should be transmitted with a higher resolution relative to portions of the image that have not changed.

19. The computer program product of claim 16, wherein the one or more predefined image resolution rules specify that multiple versions of a given image should be combined when the given image is degraded by noise.

20. The computer program product of claim 16, wherein the one or more predefined image resolution rules are based on one or more predefined policies.

* * * * *